Patented July 11, 1950

2,514,714

UNITED STATES PATENT OFFICE 2,514,714

INSECTICIDAL COMPOSITION CONTAINING A RESINOUS CLAY TOWER POLYMER

Edwin G. Marhofer, Bartlesville, Okla., assignor to Phillips Petroleum Company, a corporation of Delaware No Drawing. Application July 1, 1946,
Serial No. 680,861

4 Claims. (Cl. 167—30)

This invention relates to an insecticidal composition. In one aspect this invention relates to the use of an additive for an insecticidal composition.

Recent advances in the production of insecticides, insect repellents and the like have produced substances, such as for example, dichlorodiphenyltrichloroethane which are capable of effective action over extended periods of time. These substances are generally dissolved in a suitable solvent, usually a hydrocarbon material such as a petroleum distillate, and applied to the exposed surfaces in the infested area by brushing or spraying. In many instances the effective life of the active base or insecticide about farm buildings, livestock pens or screens, and the like is substantially shortened by the action of rain, weathering, abrasive effects, etc., which remove the material from treated surfaces.

The object of this invention is to provide a novel insecticidal composition.

Another object of this invention is to increase the period of activity of an insecticide.

Still another object of this invention is to provide a new and novel additive for incorporation into an insecticidal composition or with an insecticide.

It is another object of this invention to provide a method for preparing an insecticidal composition.

It is still another object of this invention to provide a method for exterminating insects.

It is still a further object of this invention to provide an insecticidal composition which forms a coating on the infested surfaces, which coating is relatively hard or viscous and resistant to abrasion.

Other objects and advantages of the present invention will become apparent to those skilled in the art from the accompanying description and disclosure.

According to this invention I have found a novel and useful insecticidal composition which comprises an insecticide plus a hydrocarbon resin. I have found that the activity of insecticides, insect repellents and the like can be extended over a substantial period by the incorporation of a hydrocarbon resin in insecticidal solutions before their application. Generally, the insecticidal composition will comprise of a particular insecticide, such as dichlorodiphenyltrichloroethane, a resinous hydrocarbon fraction and a normally liquid organic solvent, such as kerosene.

Such a liquid insecticidal composition containing the organic solvent and a resin of the type described in this invention is adhesive when applied to wood, metal or other surfaces and forms lasting residues or films which are not washed away by rain, volatilized by the sun's heat, or removed by ordinary abrasive action. In general, the resin imparts to the insecticidal composition drying oil characteristics which furnish certain advantages in the formation of abrasion resisting coatings after evaporation of the organic solvent. The hydrocarbon resin, after evaporation of the organic solvent, holds the insecticidal material in a solid or viscous state upon the treated surface in such a manner that the activity of the insecticide is continuously maintained. In fact, the activity of the insecticide held to the surface by the hydrocarbon resin is sufficiently effective to exterminate and control insects for periods over six weeks.

In this invention the term "insecticide" refers to a chemical agent that is used to destroy, control, or repel insects and similar pests, which includes arthropods of the Insecta class as well as the allied classes of arthropods commonly considered to be insects, such as spiders and mites. Insecticides which may be used according to this invention in combination with a hydrocarbon resin preferably comprise the stomach and contact type insecticides which are normally solid, including arsenicals such as $Ca_3(AsO_4)_2$ and $PbHAsO_4$, fluosilicates such as $Na_2SiF_6$ and $BaSiF_6$, fluorides such as $NaF$, $CaF_2$ and $AlF_3$, and the chlorinated hydrocarbons such as p-dichlorobenzene and p,p-dichlorodiphenyltrichloroethane.

The incorporation of a hydrocarbon resin of the type described herein with a normally solid halogenated hydrocarbon as the insecticide and a suitable organic solvent has been found to be particularly desirable as a spray for domestic use. Insecticides of this type comprise halogenated aliphatic hydrocarbons, such as 1,2,3,4-tetrabromobutane, and halogenated aromatic hydrocarbons, such as dichlorobenzene. The chloroethane type of insecticide, such as dichlorodiphenyltrichloroethane, is particularly preferred as the insecticide for use in this invention. Various other insecticides known to those skilled in the art may be used in combination with a hydrocarbon resin according to this invention without departing from the scope thereof.

Generally, the resin and insecticide will be incorporated in an organic solvent capable of dissolving the insecticide and the resin and sprayed or applied to the surface to be treated and the organic solvent allowed to evaporate leaving the insecticide and the resin thereon. Suitable organic solvents comprise hydrocarbon solvents, such as a kerosene fraction, an alkylate fraction, or a highly aromatic hydrocarbon fraction.

The resinous hydrocarbon additive incorporated into the insecticide composition according to this invention are those which are soluble in hydrocarbon solvents but relatively insoluble in water, substantially inactive with the solute, and of such a nature that their presence in the solution does not cause the precipitation of the active insecticide. A further property of the resinous additive is that the insecticide is held in viscous or solid solution after evaporation of the hydrocarbon solvent whereby its activity is continuously maintained from the film-like resinous residue remaining on the treated surface.

While various resinous hydrocarbon materials may be employed in the present invention, I have found particular advantageous results are secured by the use of the polymeric residues produced in clay tower refining of gasoline. These clay tower polymers are formed by the polymerization of certain unsaturated gum-forming compounds, including diolefins and the like, over fuller's earth, bentonite, or similar clay type catalyst, or charcoal and remain as a bottom product after fractionation of the gasoline treated in the clay tower. When a cracked distillate is treated in the clay tower in the vapor phase, polymerization occurs and a polymeric liquid containing some low-boiling components collects in the bottom of the tower. This polymeric fraction may be injected into the bubble tower or evaporator of the cracking system so that the low-boiling components may be recovered and the pure polymer removed as a bottom product. Or the polymeric fraction may be separately distilled and the low-boiling components removed therefrom and a resinous polymer recovered. Much polymeric material is often retained in the active clay, which material may be removed from the clay by extraction with such materials as alcohol, ether, and the like. Then the extracting agent containing the polymeric material from the clay tower may be evaporated leaving a residue of hydrocarbon resin. This resin is used as the additive for the insecticidal composition.

In general, the resinous hydrocarbon fraction obtained as bottoms from clay tower operations has the following properties as shown in Table I.

TABLE I

| Samples | 1 | 2 | 3 | 4 |
|---|---|---|---|---|
| A. P. I. Gravity | 36.7 | 30.9 | 38.7 | 34.7 |
| ASTM Distillation: | | | | |
| Initial Boiling Point | 142 | 153 | 160 | 150 |
| 5% | 236 | 240 | 250 | 240 |
| 10% | 275 | 279 | 273 | 283 |
| 20% | 328 | 330 | 380 | 336 |
| 30% | 352 | 363 | 330 | 358 |
| 40% | 370 | 384 | 347 | 373 |
| 50% | 382 | 404 | 364 | 383 |
| 60% | 393 | 426 | 380 | 396 |
| 70% | 400 | 475 | 394 | 408 |
| 80% | 426 | 530 | 417 | 482 |
| 90% | 489 | 600 | 598 | 525 |
| End Point | 568 | 680 | 668 | 674 |
| Recovery, Per Cent | 97 | 97 | 97 | 97 |

Various resinous fractions may be obtained from the above polymeric bottom fractions from clay towers by distillation to remove the lighter components. Polymeric or resinous fractions obtained directly from the clay towers and reduced to an initial boiling point of 400° F. by atmospheric distillation have the characteristics shown in Tables II and III.

TABLE II

400° F. I. B. P. resinous fractions

| Sample | 1 | 2 | 3 | 4 | 5 | 6 | 7 | 8 | 9 | 10 |
|---|---|---|---|---|---|---|---|---|---|---|
| A. P. I. Gravity @ 60° F | 20.3 | 21.9 | 24.7 | 24.9 | 23.9 | 23.4 | 27.4 | 15.0 | 26.4 | 27.3 |
| Total Solids, Weight Per Cent [1] | 62 | 42 | 34 | 37 | 29 | 46 | 26 | 80 | 29 | 20 |
| Viscosity, S. U. S. @ 100° F.[2] | 91.7 | 60.8 | 45.1 | 43.5 | 48.3 | 50.1 | 38.5 | 680.0 | 38.3 | 35.5 |
| Iodine Number, g. I$_2$/100 g. oil [3] | 165 | 165 | 155 | 163 | 160 | 173 | 150 | 260 | 150 | 117 |
| Polymer Color [4] | 2 | 2 | 2 | 2 | 2 | 2 | 2½ | 3½ | 2½ | 2½ |
| Polymer Per cent of total bottoms sample after 400° F. Cut | 56.4 | 57.9 | 56.9 | 55.6 | 55.1 | 56.5 | 52.0 | 20.7 | 49.7 | 35.4 |
| ASTM Distillation: | | | | | | | | | | |
| Initial, °F | 402 | 406 | 403 | 411 | 405 | 411 | 376 | 410 | 405 | 405 |
| 10 | 456 | 442 | 424 | 439 | 462 | 440 | 422 | 508 | 417 | 415 |
| 20 | 470 | 452 | 432 | 442 | 468 | 450 | 432 | 550 | 424 | 418 |
| 50 | 536 | 494 | 472 | 464 | 482 | 487 | 438 | 624 | 449 | 423 |
| 90 | 690 | 658 | 662 | 618 | 644 | 668 | 586 | | 630 | 633 |

[1] Per cent residue from a 1.5 g. sample evaporated in flat dish in oven 221–230° F. for 3 hrs.
[2] ASTM D445–42T Method B.
[3] Wijs Method.
[4] N. P. A. Color (ASTM D155–39T) of 1 g. polymer diluted with 99 cc. kerosene.

TABLE III

400° F. I. B. P. resinous fractions

| Sample | 11 | 12 | 13 | 14 | 15 | 16 | 17 | 18 | 19 | 20 | 21 |
|---|---|---|---|---|---|---|---|---|---|---|---|
| A. P. I. Gravity @ 60° F | 24.2 | 29.3 | 20.9 | 27.1 | 22.8 | 26.7 | 26.0 | 26.7 | 27.2 | 31.3 | 28.1 |
| Total Solids, Weight Per Cent [1] | 33 | 23 | 56 | 27 | 34 | 24 | 21 | 23 | 29 | 16 | 19 |
| Viscosity, S. U. S. @ 100° F.[2] | 44.2 | 35.5 | 59.4 | 36.6 | 42.9 | 35.5 | 35.4 | 38.2 | 36.4 | 33.3 | 35.0 |
| Iodine Number, g. I$_2$/100 g. oil [3] | 145 | 109 | 223 | 139 | 184 | 136 | 142 | 146 | 148 | 111 | 122 |
| Polymer Color [4] | 3 | 2 | 3 | 2½ | 2½ | 2½ | 2½ | 2½ | 2½ | 2 | 2½ |
| Polymer Per Cent of total bottoms sample after 400° F. Cut | 43.9 | 56.5 | 22.9 | 51.7 | 47.7 | 41.2 | 46.2 | 47.5 | 48.6 | 42.0 | 47.4 |
| ASTM Distillation: | | | | | | | | | | | |
| Initial, °F | 450 | 400 | 398 | 412 | 422 | 386 | 378 | 400 | 392 | 390 | 400 |
| 10 | 460 | 432 | 410 | 419 | 434 | 406 | 400 | 432 | 418 | 418 | 414 |
| 20 | 466 | 438 | 414 | 423 | 440 | 410 | 406 | 440 | 428 | 422 | 418 |
| 50 | 484 | 448 | 460 | 437 | 463 | 422 | 424 | 468 | 445 | 438 | 431 |
| 90 | 646 | 572 | 628 | 490 | 661 | 510 | 650 | 610 | | | |

[1] Per cent residue from a 1.5 g. sample evaporated in flat dish in oven 221–230° F. for 3 hrs.
[2] ASTM D445–42T Method B.
[3] Wijs Method.
[4] N. P. A. Color (ASTM D155–39T) of 1 g. polymer diluted with 99 cc. kerosene.

When the samples of Table II and III were distilled still further to remove further lighter components in order to yield a residue of approximately 65 per cent solids content, samples were obtained having the characteristics shown in Tables IV and V:

As is apparent resinous fractions of the desired characteristics may be obtained by distilling poly-

TABLE IV
*Properties of resins of about 65 per cent solids content*

| Sample | 1 | 2 | 3 | 4 | 5 | 6 | 7 | 8 | 9 | 10 |
|---|---|---|---|---|---|---|---|---|---|---|
| Total Solids, Weight Per cent [1] | 62 | 62 | 62 | 61 | 63 | 74 | 58 | 80 | 73 | 77 |
| Yield, Per cent (Wt.) [2] | 100 | 72 | 57 | 67 | 61 | 61 | 51 | 100 | 39 | 26 |
| Iodine Number, g. $I_2$/100 g. Oil [3] | 165 | 190 | 195 | 185 | 175 | 195 | 190 | 260 | 200 | 225 |
| A. P. I. Gravity @ 60° F | 20.3 | 18.2 | 18.4 | 20.1 | 17.2 | 17.6 | 19.9 | 15.0 | 18.5 | 12.8 |
| Viscosity, Gardner-Holdt [4] | A | B | C | A | B | C | A | N | D | O |
| Estimated Yield of 65 Weight per cent solids material [5] | 98 | 69 | 53 | 63 | 59 | 68 | 41 | 115 | 47 | 31 |

[1] Per cent residue from a 1.5 g. sample evaporated in a flat dish in oven @ 221-230° F. for 3 hrs.
[2] Based on 400° F. I. B. P. resinous fraction of Tables II and III.
[3] Wijs Method.
[4] Gardner Bubble Visometer (Varnish Series), Henry A. Gardner Laboratory, Inc., Washington, D. C. ASTM D154-28.
[5] Based on 400° F. I. B. P. resinous fraction of Tables II and III.

TABLE V
*Properties of resins of about 65 per cent solids content*

| Sample | 11 | 12 | 13 | 14 | 15 | 16 | 17 | 18 | 19 | 20 | 21 |
|---|---|---|---|---|---|---|---|---|---|---|---|
| Total Solids, Weight Per Cent [1] | 57 | 64 | 65 | 53 | 66 | 62 | 71 | 63 | 63 | 65 | 54 |
| Yield, Per Cent (Wt.) [2] | 61 | 29 | 77 | 48 | 59 | 36 | 57 | 39 | 37 | 18 | 33 |
| Iodine Number, g. $I_2$/100 g. Oil [3] | 190 | 195 | 250 | 185 | 235 | 220 | 210 | 220 | 220 | 220 | 205 |
| A. P. I. Gravity @ 60° F | 16.8 | 18.0 | 17.3 | 20.5 | 16.2 | 16.0 | 14.0 | 16.9 | 16.4 | 19.6 | 17.8 |
| Viscosity, Gardner-Holdt [4] | B | B | A | A | B | A | E | B | B | A | A |
| Estimated Yield of 65 Weight per cent solids material [5] | 53 | 29 | 77 | 43 | 48 | 34 | 60 | 38 | 35 | 18 | 29 |

[1] Per cent residue from a 1.5 g. sample evaporated in a flat dish in oven @ 221-230° F. for 3 hrs.
[2] Based on 400° F. I. B. P. resinous fraction of Tables II and III.
[3] Wijs Method.
[4] Gardner Bubble Visometer (Varnish Series), Henry A. Gardner Laboratory, Inc., Washington, D. C., ASTM D154-28.
[5] Based on 400° F. I. B. P. resinous fraction of Tables II and III.

When the samples of Tables II and III were distilled at reduced pressure to produce a solid resin, a residue of the characteristics shown in Tables VI and VII were obtained.

meric fractions from a clay tower with a high vacuum between 10 and 25 mm. of mercury, with a moderate vacuum between 150 and 350 mm. of mercury and superheated steam or with super-

TABLE VI
*Solid resins*

| Sample | 1 | 2 | 3 | 4 | 5 | 6 | 7 | 8 | 9 | 10 |
|---|---|---|---|---|---|---|---|---|---|---|
| Yield, Weight per cent [1] | 27.7 | 24.7 | 18.4 | 19.1 | 18.7 | 20.5 | 14.8 | 42.3 | 14.6 | 12.6 |
| Softening Point, °F [2] | 156 | 154 | 155 | 157 | 154 | 156 | 145 | 150 | 150 | 153 |
| Iodine Number g. $I_2$/100 g. Resin [3] | 240 | 220 | 220 | 231 | 234 | 240 | 243 | 242 | 230 | 236 |
| Ash | Trace | Trace | Trace | Trace | Trace | Trace | Trace | Trace | Trace | Trace |
| Acidity [4] | 1 | 1 | 1 | 1 | 1 | 1 | 1 | 1 | 1 | 1 |

CONDITIONS USED IN PREPARATION OF RESINS

| Pressure mm. Hg | 12 | 12 | 13 | 14 | 14 | 14 | 14 | 15 | 15 | 14 |
|---|---|---|---|---|---|---|---|---|---|---|
| Maximum Liquid Temp., °F | | 557 | 560 | 568 | 560 | 555 | 560 | 580 | 560 | 554 |
| Maximum Vapor Temp., °F | 510 | 470 | 495 | 504 | 484 | 493 | 488 | 504 | 492 | 473 |

[1] Based on 400° F. I. B. P. resinous fractions of Tables II and III.
[2] Ring and Ball Method, ASTM D36-26.
[3] Wijs Method.
[4] ASTM D663-44T, Resin dissolved in 10 ml. hydrocarbon solvent.

TABLE VII
*Solid resins*

| Sample | 11 | 12 | 13 | 14 | 15 | 16 | 17 | 18 | 19 | 20 | 21 |
|---|---|---|---|---|---|---|---|---|---|---|---|
| Yield, Weight per cent [1] | 16.7 | 8.6 | 25.4 | 11.6 | 17.0 | 12.2 | 11.9 | 13.8 | 13.6 | 6.9 | 9.9 |
| Softening Point, °F [2] | 146 | 155 | 152 | 148 | 154 | 158 | 157 | 155 | 147 | 142 | 154 |
| Iodine Number g. $I_2$/100 g. Resin [3] | 218 | 229 | 237 | 223 | 233 | 230 | 249 | 242 | 235 | 234 | 247 |
| Ash | Trace | Trace | Trace | Trace | Trace | Trace | Trace | Trace | Trace | Trace | Trace |
| Acidity [4] | 1 | 1 | 1 | 1 | 1 | 1 | 1 | 1 | 1 | 1 | 1 |

CONDITIONS USED IN PREPARATION OF RESINS

| Pressure mm. Hg | 14 | 13 | 14 | 14 | 14 | 14 | 14 | 14 | 14 | 14 | 14 |
|---|---|---|---|---|---|---|---|---|---|---|---|
| Maximum Liquid Temp., °F | 560 | 570 | 560 | 562 | 562 | 562 | 560 | 554 | 552 | 554 | 556 |
| Maximum Vapor Temp., °F | 490 | 489 | 484 | 484 | 482 | 481 | 478 | 474 | 470 | 468 | 476 |

[1] Based on 400° F. I. B. P. resinous fractions of Tables II and III.
[2] Ring and Ball Method, ASTM D36-26.
[3] Wijs Method.
[4] ASTM D663-44T, Resin dissolved in 10 ml. hydrocarbon solvent.

heated steam alone. The removal of the volatile constituents is continued until the desired melting point of the bottoms is obtained.

Preferably, a so-called intermediate resinous fraction which has been partially stripped but is still in the liquid phase at atmospheric conditions, such as those fractions of Table IV and V having a solids content between about 60 and 70, an A. P. I. gravity between about 15 and about 20 and a Gardner-Holdt viscosity between about B and about H is used as the resinous additive. The solid resinous fraction, such as those resins of Tables VI and VII, having a softening point between about 140 and about 160° F. and an iodine number between about 220 and about 250 have also been found to be excellent additives according to this invention when used in admixture with a suitable organic solvent and an insecticide.

Catalytic hydrogenation of the resinous fractions gives a lighter colored saturated resin which is usually harder than that obtained by the aforementioned method and which is also soluble in hydrocarbons. For such hydrogenation, any suitable known hydrogenation catalyst may be employed which is capable of effecting saturation of the unsaturated polymers. So-called "Raney Nickel" has been found desirable in accomplishing this result when the hydrogenation is conducted at moderate temperatures and pressures. Usually pressures between about 50 and about 150 pounds per square inch gage and temperatures from 100 to 300° F. are used.

Any of the above described resinous fractions may be used in combination with an insecticide, with or without an organic solvent, to produce the insecticidal composition having the characteristics described herein. The necessity or desirability of an organic solvent will depend upon the character of both the resinous fraction and the insecticide. With those resinous fractions which contain a substantial portion of low-boiling components little or no organic solvent is needed. Unhydrogenated resinous fractions furnish certain advantages in the formation of abrasion-resisting coating after evaporation of the hydrocarbon solvent. Hydrogenated resinous fractions are lighter in color and are thus particularly suitable for use as an additive for insecticides employed about porches or screens and other domestic use.

Other resinous fractions may be used than those obtained from clay tower bottoms. For example, cumar resins have been found to be a desirable additive for an insecticidal composition. Cumar resins comprise a mixture of polymerized coumarone, indene and homologous compounds produced by the polymerization of naphtha in the presence of air or other oxidizing atmosphere.

The proportion of additive materials employed in production of insect controlling solutions may vary over a rather broad range. In general, the per cent of additive resinous fraction will depend upon the amount of the insecticide in the solution and the period over which the activity of the insecticide is to be extended. When short time control is desired, for example, about six weeks, a low per cent of active insecticide and a small proportion of additive are sufficient. On the other hand when the control period extends over an entire season, much higher concentrations of both insecticide and resinous additive will be desired. In general, an insecticidal composition will comprise between about 2 and about 50 parts by weight of an insecticide, between about 0.5 and about 10 parts by weight of a hydrocarbon resin and between about 100 and about 50 parts by weight of an organic solvent. Obviously, the particular additive resinous material employed and the form in which it is used will effect considerable variation in the per cent required to produce optimum results. Various concentrations other than those disclosed and mixtures of different insecticides and different solvents may be used without departing from the scope of the invention.

The following examples are offered as merely illustrative of the application of the present invention in which a hydrocarbon resin is incorporated in an insecticidal composition and the examples should not be construed to be unnecessarily limiting to this invention.

EXAMPLE I

Two test panels were sprayed with 5 per cent solutions of dichlorodiphenyltrichloroethane dissolved in kerosene. On one panel the spray was applied without an additive resinous material, while to that of the second panel, about one part by weight of a liquid resinous fraction similar to the so called intermediate fraction described above was incorporated within the insecticidal composition. The panels were subjected to out-of-door exposure in a fly infested area. The additive-containing spray showed active insecticidal properties after six weeks exposure while the control sample was substantially inactive at the end of two weeks.

EXAMPLE II

An insecticidal composition was prepared by admixture of about 5 parts by weight of a solid hydrocarbon resinous fraction similar to that described above in a solution of about 25 parts by weight of dichlorodiphenyltrichloroethane in about 75 parts by weight of kerosene. Panels were sprayed with this solution and exposed. A brown film was formed which showed persistent insecticidal properties, the activity of which lasted for several months.

Obviously, various insecticides and insecticidal compositions to which a hydrocarbon resin may be added will become apparent to those skilled in the art without departing from the scope of this invention.

I claim:

1. An insecticide composition comprising an effective quantity of a contact insecticide and a resin, derived from the polymeric residues obtained from the clay tower treatment of gasoline, selected from the group consisting of those resins having a solids content of 60 to 70 weight per cent, an A. P. I. gravity of 15 to 20 and a Gardner-Holdt viscosity of B to H, and those resins having a softening point between 140 and 160° F. and an iodine number between 220 and 250.

2. An insecticide composition comprising an effective quantity of a contact insecticide and a liquid resin extracted from polymeric residues from clay tower treatment of gasoline, said resin having a solids content of 60 to 70 weight per cent, an A. P. I. gravity of 15 to 20, and a Gardner-Holdt viscosity of B to H.

3. An insecticidal composition comprising 2 to 50 parts by weight of dichlorodiphenyltrichloroethane, 50 to 100 parts by weight of an organic solvent, and 0.5 to 10 parts by weight of a hydrocarbon resin, derived from a polymeric residue obtained upon clay tower treatment of gasoline, selected from the group consisting of those resins having a solids content of 60 to 70 weight per cent, an A. P. I. gravity of 15 to 20 and a Gardner-Holdt viscosity of B to H, and those resins having a softening point between 140 and 160° F. and an iodine number between 220 and 250.

4. An insecticidal coating composition comprising a minor but effective amount of an insecticide comprising dichlorodiphenyltrichloroethane and a major amount of a liquid resin extracted from polymeric residues from clay tower treatment of gasoline, said resin having a solids content of 60 to 70 weight per cent, an A. P. I. gravity of 15 to 20, and a Gardner-Holdt viscosity of B to H.

EDWIN G. MARHOFER.

REFERENCES CITED

The following references are of record in the file of this patent:

UNITED STATES PATENTS

| Number | Name | Date |
|---|---|---|
| 2,261,758 | Gustafson | Nov. 4, 1941 |
| 2,266,360 | Edwards et al. | Dec. 16, 1941 |
| 2,291,507 | Sowers | July 28, 1942 |

OTHER REFERENCES

Carrick, "Use of DDT in Paint," Paint, Oil and Chem. Rev., Nov. 1, 1945, pages 104, 105 (106–15 AF.).

Paint Mfg., Dec. 1944, pages 353–354.

Hayhurst, J. Soc. Chem. Ind., Oct. 1945, page 296.